(12) United States Patent
Huang et al.

(10) Patent No.: US 7,366,301 B2
(45) Date of Patent: Apr. 29, 2008

(54) OPTICAL WATERMARK

(75) Inventors: Sheng Huang, Singapore (SG); Jian Kang Wu, Singapore (SG)

(73) Assignee: Trustcopy Pte Ltd., Singapore (SG)

( * ) Notice: Subject to any disclaimer, the term of this patent is extended or adjusted under 35 U.S.C. 154(b) by 616 days.

(21) Appl. No.: 09/810,971

(22) Filed: Mar. 16, 2001

(65) Prior Publication Data

US 2002/0054680 A1    May 9, 2002

Related U.S. Application Data (63) Continuation-in-part of application No. PCT/SG00/00147, filed on Sep. 15, 2000.

(51) Int. Cl.
- *G09C 3/08* (2006.01)
- *G09C 3/00* (2006.01)
- *H04L 15/34* (2006.01)
- *H04L 9/00* (2006.01)
- *B42D 15/00* (2006.01)
- *G06K 15/00* (2006.01)
- *H04N 1/40* (2006.01)

(52) U.S. Cl. .................. 380/51; 380/54; 713/176; 283/72; 283/93; 283/94; 283/113; 358/3.28

(58) Field of Classification Search ............... 358/3.28; 235/494; 283/113, 72, 93–94; 380/154, 380/54, 51; 382/100; 713/176, 179, 180, 713/181; 705/58; 726/32
See application file for complete search history.

(56) References Cited

U.S. PATENT DOCUMENTS

| | | | | |
|---|---|---|---|---|
| 4,838,644 A | * | 6/1989 | Ochoa et al. ............... 359/9 |
| 4,921,278 A | | 5/1990 | Shiang et al. | |
| 5,396,559 A | * | 3/1995 | McGrew ................... 380/54 |
| 5,659,613 A | * | 8/1997 | Copeland et al. .......... 380/202 |
| 5,708,717 A | | 1/1998 | Alasia | |
| 5,734,752 A | | 3/1998 | Knox | |
| 5,767,889 A | * | 6/1998 | Ackley ..................... 347/171 |
| 5,790,703 A | | 8/1998 | Wang | |
| 5,915,027 A | | 6/1999 | Cox et al. | |
| 5,951,055 A | | 9/1999 | Mowry, Jr. | |
| 5,995,638 A | * | 11/1999 | Amidror et al. ........... 382/100 |
| 6,000,728 A | | 12/1999 | Mowry, Jr. | |
| 6,104,812 A | | 8/2000 | Koltai et al. | |
| 6,145,081 A | * | 11/2000 | Winograd et al. .......... 713/200 |
| 6,252,971 B1 | * | 6/2001 | Wang ........................ 382/100 |
| 6,345,104 B1 | * | 2/2002 | Rhoads ..................... 382/100 |

(Continued)

OTHER PUBLICATIONS

Cheveau, L. et al. "Choosing a Watermarking System for Digital Television—The Technology and the Compromises", 2003, <http://www.broadcastpapers.com/asset/IBCebuwatermarking03.htm>.*

(Continued)

*Primary Examiner*—Gilberto Barron, Jr.
*Assistant Examiner*—Michael J Simitoski
(74) *Attorney, Agent, or Firm*—Merchant & Gould P.C.

(57) ABSTRACT

A multiple-layered watermark is generated to be placed on document, to protect against counterfeiting and forgery. Hidden information embedded into each of the watermark's layers is only detectable by using a corresponding decoder. Because of the multiple-layered structure, it is difficult to reverse engineer the optical watermark. The generalized watermark structure significantly increases the "key space" of the decoder.

19 Claims, 6 Drawing Sheets

U.S. PATENT DOCUMENTS

| | | | |
|---|---|---|---|
| 6,438,251 B1 * | 8/2002 | Yamaguchi | 382/100 |
| 6,456,726 B1 * | 9/2002 | Yu et al. | 382/100 |
| 6,577,746 B1 * | 6/2003 | Evans et al. | 382/100 |
| 6,636,616 B1 * | 10/2003 | Harrington | 382/100 |
| 6,748,533 B1 * | 6/2004 | Wu et al. | 713/176 |
| 6,879,652 B1 * | 4/2005 | Srinivasan | 375/377 |

OTHER PUBLICATIONS

Chiang, Hwa. "SMB Seminar Series 1", Sep. 2001.*

Hel-Or, Hagit Z. "Copyright Labeling of Printed Images", 2000 IEEE, pp. 702-705.*

Institute of Packaging Professionals. "Smart Packaging News", Sep. 2004.*

Kishigami, Junichi et al. "Meta-Watermarking", Jan. 2001.*

Mintzer, Fred et al. "If One Watermark is Good, Are More Better?", ICASSD 1999.*

O Ruanaidh, J.J.K. et al. "Phase Watermarking of Digital Images", 1996 IEEE, pp. 239-242.*

O Ruanaidh, Joseph J. K. et al. "A Secure Robust Digital Image Watermark", 1998.*

Tao, Peining et al. "A robust multiple watermarking scheme in Discrete Wavelet Transform domain", 2004.*

Ostromoukhov, Victor et al. "Stochastic Clustered-Dot Dithering", 1999.*

Wikipedia.org. "Color printing", printed May 9, 2007.*

Russell L. DeValois & Karen K. DeValois, "Spatial Vision", New York: Oxford University Press, 1998 Chapters 5-11 (pp. 147-332).

Sayrol et al, "Optimum Watermark Detection in Color Images", Oct. 1999, pp. 231-235.

Piva et al, "Exploiting the Cross-correlation of RGB-channels for Robust Watermarking of Color Images", Oct. 1999, pp. 306-310.

Wolfgang et al, "A Watermark for Digital Images", Sep. 1996, pp. 219-222.

* cited by examiner

OPTICAL WATERMARK

This application is a continuation-in-part of international application number PCT/SG00/00147, filed 15 Sep. 2000, pending.

FIELD OF THE INVENTION

This invention generally relates to a method and apparatus for producing optical watermarks on printed and electronic documents.

DEFINITION

Throughout this specification or reference to a document is to be taken as including a printed document and/or an electronic document and/or a copy (printed or electronic) of a printed document and/or a copy (printed or electronic) of an electronic document and will include such a document with text, image, graphics, video, photographs, and other multimedia appearing thereon or therein.

BACKGROUND TO THE INVENTION

The structure of a watermark, referred to as carrier dot pattern, is a repetitive pattern with the simplest and most basic as a two-dimensional ("2-D") dot array. The complexity of the dot pattern structure determines the security level. Embedding a latent image object into a watermark is implemented by the modulation on the dot pattern with the latent image object. Observing the latent image using a decoder is a process of demodulation. The decoder is also a structured pattern, which corresponds to a particular dot pattern. It is implemented as an optical instrument, such as gratings, lenses, Ronchi Rulings, special films, or even a photocopier.

CONSIDERATION OF THE PRIOR ART

U.S. Pat. No. 5,915,027 relates to digital watermarking of data, including image, video and audio data, which is performed by repeatedly inserting the watermark into subregions or subimages of the data. Similarly, the watermark is repeatedly extracted from the subregions of the data. This method is in a single layer and is not suitable to a text-based document or a document printed on paper.

U.S. Pat. No. 4,921,278 has an identification system using a computer generated Moire, and is based on a computer generated random pattern of broken lines. The overlap of the object grid and the reference grid will induce the moire effect. This method is in a single layer, is rather simple, and does not provide enough protection, such as counterfeit indication.

U.S. Pat. No. 5,734,752 is a method for generating watermarks in a digitally reproducible document which are substantially invisible when viewed. It uses stochastic screen patterns suitable for reproducing a gray image on a document, and another stochastic screen to correlate the first in order to view the content. This is quite similar to U.S. Pat. No. 4,921,278, except that it uses stochastic screen patterns to represent the gray images.

Other patents similar to these include: U.S. Pat. No. 5,708,717 which combines a source image with a latent image so that the scrambled latent image is visible only when viewed through a special decoder lens; U.S. Pat. No. 5,790,703 produces a, first screen pattern suitable for reproducing a gray image on a document and deriving at least one conjugate screen description that is related to the first pattern, so that overlapping them can reveal the content of the document; and U.S. Pat. No. 6,000,728 uses different sizes of dot screens for anti-counterfeiting.

As can be seen from these US patents, there is only one layer of hidden information. The structure is exposed to attackers. Carefully observation of the structure with a microscope or similar instrument will reveal all information required to forge the image or document.

It is the principal object of the present invention is to address this problem and to provide a watermark which, in general, will not normally allow all necessary information to be revealed.

SUMMARY OF THE INVENTION

The present invention provides a method and apparatus to protect documents from counterfeit and forgery. It embeds multiple latent image objects into layers of repetitive structures to generate a watermark. The watermark is then incorporated into a document as for example, a seal, logo or background. This may be referred to as an optical watermark.

An optical watermark has one or several watermark layers. One or two latent image objects are embedded into each watermark layer. Each watermark layer has different structure, as well as a corresponding decoder to observe the latent image object embedded in it. The latent image object embedded in a watermark layer can not be observed by the unaided human eye unless a decoder corresponding to that watermark layer's structure is overlapped onto the watermark. On the other hand, a decoder for one watermark layer will not reveal latent image objects in other watermark layers due to the difference in their structure. As such, decoders can be considered as keys to the secrets, and the secrets are the latent image objects embedded in the watermark.

Layers in the optical watermark protect each other. Without knowing all the secrets (including latent image objects and parameters of the dot patterns) of the optical watermark, it's almost impossible to forge the watermark or change the latent image objects in watermark layers without being noticed.

The combination of layers of various security levels provides solutions for various applications needs. For example, an optical watermark may appear as the logo of a company on a document issued by that company. There can be, for example, three watermark layers. The first layer may be a cancellation word, such as "COPY", and the verification device is the photocopier. The cancellation word "COPY" appears if the printed original document is photocopied. The latent image object in the second layer may be a logo of the company, and the verification device is a specially designed lens with gratings defined by periodical functions. The lens can be given to the related organisations to verify the originality of the document. The third layer may be embedded with a logo of a trusted third party. The verification device is also a lens, but the structure is random dot pattern, which is more secure than the other layers.

Because the superposition of multiple layers is a noninversable process, the complicity of the optical watermark increases and it is very difficult, if not impossible, to reverse engineer to derive the parameters and hidden information from the watermark. Because there are multiple layers, different verification methods, including counterfeit indication, can be combined to form a much more secure application. These verifications can be done off-line with very simple devices. Above all, the invented method and aparatus can achieve very high security without using special ink or special paper.

BRIEF DESCRIPTION OF DRAWINGS

In order that the invention may be clearly understood and readily put into practical effect, there shall be described by way of non-limitative example only preferred embodiments of the present invention, the description being with reference to the accompanying illustrative drawings in which.

DETAILED DESCRIPTION OF THE PREFERRED EMBODIMENT

Figure 1:
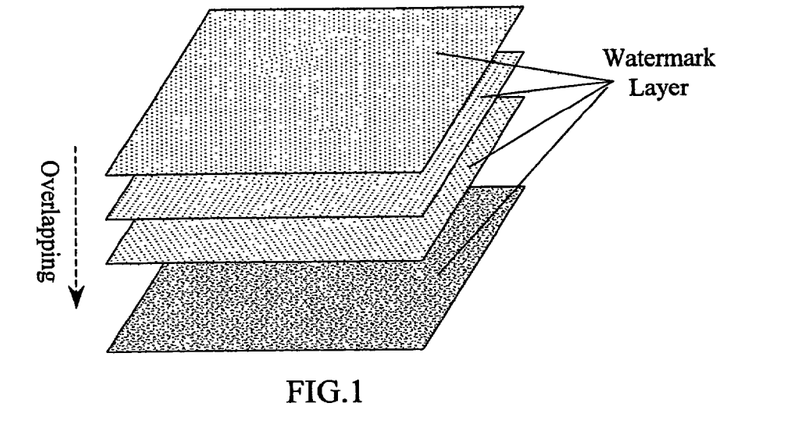
FIG. 1 shows a layered structure of an optical watermark.

The optical watermark in this invention has a multiple layered structure as shown in FIG. 1. Watermark layers are superposed on each other to provide multiple layers and categories of protection. This superposition of several layers means that it is very difficult, if not impossible, to derive the parameters of the structure and the hidden information from the optical watermark alone.

Each watermark layer is a repetitive structured array of dots. Latent image objects are embedded into the watermark layer by modulation. This may include, for example, phase modulation. The structure and orientation of the different watermark layers in an optical watermark must be different from each other. Only the decoder corresponding to a particular watermark layer can be used to view the latent image object embedded in that particular watermark layer.

Basic watermark layer-2-D dot arrays

Figure 2:
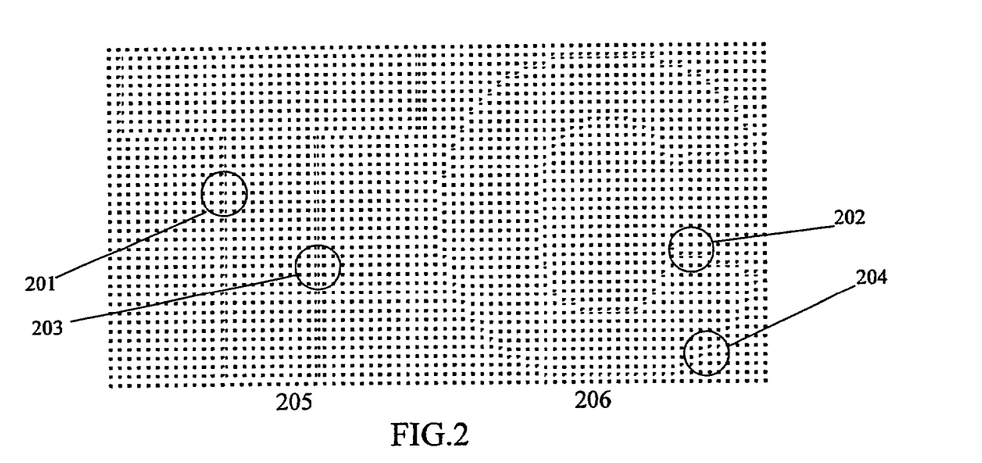
FIG. 2 is an illustration of embedding latent image objects into a basic watermark layer.

The basic watermark layer is a 2-D dot array, varying in two orthogonal directions. To embed latent images, phase modulation can be applied to both directions. As shown in FIG. 2, part 205 is the phase modulation in the horizontal direction to embed a letter "T", while part 206 shows the phase modulation in the vertical direction to embed a letter "C".

Figure 3:
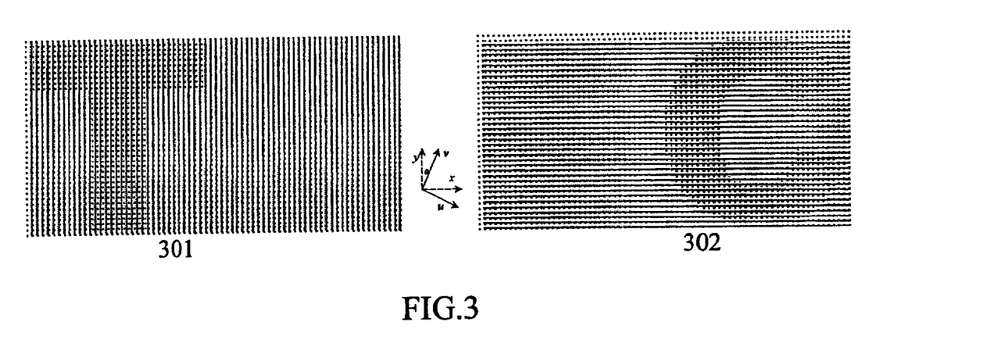
FIG. 3 is a demodulation result of letters "T" and "C"

The phase modulation changes the distances between a pair of dots at the edge of the latent images in the direction of the phase modulation. According to the characteristics of the human visual system, such changes of distances will make the edge of the latent image become either lighter or darker than the overall grey level of the dot array. Such effect will reveal the shape of the latent images. In order to compensate for this effect, a "smoothing" process may be applied to the regions with an abrupt phase shift. For example, in FIG. 2, along regions indicated as 201 and 202, the distance between a pair of dots was greater than the spatial repetitive period of the dot array. Therefore, a dot is added, together with distance adjustment, to make the edge a little darker. Patterns 201 and 202 are the results after compensation. On other hand, when the distance between two dots is much smaller than the repetitive period of the dot array, distance adjustment may also be necessary to make the edge a little lighter. Patterns 203 and 204 are the result of this type of adjustment. To view the latent image objects in the modulated dot arrays, the decoder should have a grating structure with the same spatial frequency as the dot arrays. In order to demodulate the latent image modulated in a particular direction, the orientation of the decoder should be aligned in the same direction. FIG. 3(01) and FIG. 3(02) show the demodulation result of FIG. 2. The detailed mathematical analysis is in accordance with a Fourier Series Expansion.

Mathematical Analysis of Phase Modulation for Embedding a Latent Image into a Basic Watermark Layer In the optical watermark, dot arrays are selected as the carrier dot patterns to embed latent image objects. Because dot arrays can be considered as 2-D signals, which vary in two orthogonal directions, two latent image objects can be modulated to one dot pattern in two directions with phase modulation. For the sake of simplicity, the dot arrays discussed here have the same spatial repetitive frequency in both directions. In an actual optical watermark, the frequencies in the two directions may be different.

A Fourier series expansion is employed to analyse the modulation and demodulation. Let us denote basic dot pattern as $f \in [0,1]$ $f_0(x,y)$, where and the value 0 represents black, and 1 represents white. The superposition of line gratings can be represented with the product of functions. This multiplicative model enables analysis with a Fourier series expansion.

The phase-shifted dot array can be represented as $f_1(x,y)$ and $f_2(x,y)$, each corresponding to a modulation direction.

$$f_0(x, y) = 1 - \sum_{n=-\infty}^{\infty} \delta(x - nT) \sum_{n=-\infty}^{\infty} \delta(y - nT) \quad (1)$$

$$f_1(x, y) = 1 - \sum_{n=-\infty}^{\infty} \delta\left(x - nT - \frac{T}{2}\right) \sum_{n=-\infty}^{\infty} \delta(y - nT) \quad (2)$$

$$f_2(x, y) = 1 - \sum_{n=-\infty}^{\infty} \delta(x - nT) \sum_{n=-\infty}^{\infty} \delta\left(y - nT - \frac{T}{2}\right) \quad (3)$$

Two latent image objects to be modulated can be represented as $g_1(x,y)$ and $g_2(x,y)$. Their valid values can only be either 0 or 1. So the watermarked dot array can be represented as $$w(x,y) = g_1(x,y)g_2(x,y)f_0(x,y) + [1-g_1(x,y)]f_1(x,y) + [1-g_2(x,y)]f_2(x,y) \quad (4)$$

The decoders can be represented as $$f_d = (x, y) = 1 - \sum_{n=-\infty}^{\infty} \delta(x\cos\theta - y\sin\theta - nT) \quad (5)$$

In eq. (A.5) the angle θ is the angle between the orientation of $f_d(x,y)$ and the direction of y-axis. The superposition of the watermarked dot array and the decoder can be represented as $$d(x,y) = w(x,y)f_d(x,y) \quad (6)$$

All these functions can then be expanded into Fourier series as following.

$$f_0(x, y) = 1 - \left[\frac{1}{T} + \frac{2}{T}\sum_{n=1}^{\infty}\cos\left(2\pi\frac{n}{T}x\right)\right]\left[\frac{1}{T} + \frac{2}{T}\sum_{n=1}^{\infty}\cos\left(2\pi\frac{n}{T}y\right)\right] \quad (7)$$

$$f_1(x, y) = 1 - \left[\frac{1}{T} + \frac{2}{T}\sum_{n=1}^{\infty}\cos(n\pi)\cos\left(2\pi\frac{n}{T}x\right)\right]\left[\frac{1}{T} + \frac{2}{T}\sum_{n=1}^{\infty}\cos\left(2\pi\frac{n}{T}y\right)\right] \quad (8)$$

$$f_2(x, y) = 1 - \left[\frac{1}{T} + \frac{2}{T}\sum_{n=1}^{\infty}\cos\left(2\pi\frac{n}{T}x\right)\right]\left[\frac{1}{T} + \frac{2}{T}\sum_{n=1}^{\infty}\cos(n\pi)\cos\left(2\pi\frac{n}{T}y\right)\right] \quad (9)$$

$$f_d(x, y) = \left(1 - \frac{1}{T}\right) - \frac{2}{T}\sum_{n=1}^{\infty}\cos\left[2\pi\frac{n}{T}(x\cos\theta - y\sin\theta)\right] \quad (10)$$

The superposition can be analysed based on above expansions. There will be many components in the expansion of eq. (A.6). In order to make the analysis as clear as possible, all high frequency components can be ignored. Only the components, which probably have lower frequencies will be referred to in this analysis. Such components in d(x,.y) are analysed as following equations.

$$\sum_{n=1}^{\infty}\cos\left(2\pi\frac{n}{T}x\right)\sum_{n=1}^{\infty}\cos\left[2\pi\frac{n}{T}(x\cos\theta - y\sin\theta)\right] = \frac{1}{2}\sum_{m=1}^{\infty}\sum_{n=1}^{\infty} c_1(m, n) + c_1(m, -n) \quad (11)$$

$$c_1(m, n) = \cos\frac{2\pi}{T}[(m + n\cos\theta)x - n y\sin\theta] \quad (12)$$

$$\sum_{n=1}^{\infty}\cos\left(2\pi\frac{n}{T}y\right)\sum_{n=1}^{\infty}\cos\left[2\pi\frac{n}{T}(x\cos\theta - y\sin\theta)\right] = \frac{1}{2}\sum_{m=1}^{\infty}\sum_{n=1}^{\infty} c_2(m, n) + c_2(m, -n) \quad (13)$$

$$c_2(m, n) = \cos\frac{2\pi}{T}[nx\cos\theta + (m - n\sin\theta)y] \quad (14)$$

When the value of $\theta$ is very close to 0°, only the frequency of the component $c_1(1,-1)$ will be much lower than the frequency of the carrier dot pattern. While the value of $\theta$ is slightly above or below 90°, only the component $c_2(1,1)$ will have lower frequency. So for these two cases only $c_1(1,-1)$ or $c_2(1,1)$ will be significant in superposition.

$$c_1(1, -1) = \cos\frac{2\pi}{T}[(1 - \cos\theta)x + y\sin\theta] \quad (15)$$

$$c_2(1, 1) = \cos\frac{2\pi}{T}[x\cos\theta + (1 - \sin\theta)y] \quad (16)$$

In case when $c_1(1,-1)$ is most significant, the significant components in eq. (6) will be the following three. Then only one latent image $g_1(x,y)$ can be clearly observed because of the relative phase.

$$g_1(x, y)g_2(x, y)\cos\frac{2\pi}{T}[(1 - \cos\theta)x + y\sin\theta] \quad 1)$$

$$[1 - g_1(x, y)]\cos\frac{2\pi}{T}\left[(1 - \cos\theta)x + y\sin\theta \pm \frac{T}{2}\right] \quad 2)$$

$$[1 - g_2(x, y)]\cos\frac{2\pi}{T}[(1 - \cos\theta)x + y\sin\theta] \quad 3)$$

In case when $c_2$ (1,1) is most significant, the significant components in eq. (6) will be the following three. Then only one latent image $g_2(x,y)$ can be clearly observed because of the relative phase.

$$g_1(x, y)g_2(x, y)\cos\frac{2\pi}{T}[x\cos\theta + (1 - \sin\theta)y] \quad 1)$$

$$[1 - g_1(x, y)]\cos\frac{2\pi}{T}[x\cos\theta + (1 - \sin\theta)y] \quad 2)$$

$$[1 - g_2(x, y)]\cos\frac{2\pi}{T}\left[x\cos\theta + (1 - \sin\theta)y \pm \frac{T}{2}\right] \quad 3)$$

The mathematical derivation shows that with phase modulation two latent image objects can be modulated to the basic dot pattern. Because of the relatively high frequency of the dot array and the compensation methods applied on the edge, the latent image objects will not be observed by unaided eyes. In order to view the latent image objects, the frequency of the decoder should be the same as the frequency of the basic carrier dot pattern along that direction, and the orientation of the decoder should be aligned to the same direction in which the latent image object is modulated.

Here there are used two characteristics of the human visual system. First, the human visual system has the highest contrast sensitivity in the mid spatial frequency range, around 2-6 c/deg. The sensitivity has a sharp drop at high spatial frequencies. Second, the human eye is sensitive to relative phase, which is the shift or displacement between spatial signals at same frequency. For frequencies higher than 3 c/deg, the threshold phase is represented by the displacement of about 0.85' arc. For frequencies less than 3 c/deg, the threshold of relative phase is about 5°. A human observer will not be able to observe the relative phase, which is less than this threshold. So for high frequency signals, the displacement will not be easily observed by unaided eyes.

The latent image object in each watermark layer is encoded with relatively high repetitive frequency dot patterns with phase modulation. The displacement is not significant to the human visual system because the relative phase difference is lower than, or similar to, the threshold at that relative high frequency, which is selected for the optical watermark. So the latent image objects will not be observed without proper decoders.

To generalise from the 2-D dot array watermark layer, the frequencies of dot arrays along two directions can be different, and the dot arrays may take any orientation. If the watermark layer is denoted as $L(f_u, f_v, \theta, g_u, g_v)$, where $f_u$ and $f_v$ are the frequencies of dot array in two directions $\vec{u}$ and $\vec{v}$, respectively, and $\theta$ is the angle between $\vec{u}$ and $\vec{x}$ (horizontal axis), the functions $g_u$ and $g_v$, whose value can only be 1 or 0, represent the latent image objects in this layer. The function representing a watermark layer is:

$$L[f_u, f_v, \theta, g_u(x, y), g_v(x, y)] = g_u(x, y)g_v(x, y)\left[1 - \sum_{n=-\infty}^{\infty}\delta\left(x\cos\theta + y\sin\theta - \frac{n}{f_u}\right)\sum_{n=-\infty}^{\infty}\delta\left(y\cos\theta + x\sin\theta - \frac{n}{f_v}\right)\right] + $$
$$g_v(x, y)[1 - g_u(x, y)]\left[1 - \sum_{n=-\infty}^{\infty}\delta\left(x\cos\theta + y\sin\theta - \frac{n}{f_u} - \frac{1}{2f_u}\right)\sum_{n=-\infty}^{\infty}\delta\left(y\cos\theta - x\sin\theta - \frac{n}{f_v}\right)\right] + g_u(x,y)[1 - g_v(x, y)]\left[1 - \sum_{n=-\infty}^{\infty}\delta\left(x\cos\theta + y\sin\theta - \frac{n}{f_u}\right)\sum_{n=-\infty}^{\infty}\delta\left(y\cos\theta - x\sin\theta - \frac{n}{f_v} - \frac{1}{2f_v}\right)\right] + [1 - g_u(x, y)][1 - g_v(x, y)]\left[1 - \sum_{n=-\infty}^{\infty}\delta\left(x\cos\theta + y\sin\theta - \frac{n}{f_u} - \frac{1}{2f_u}\right)\sum_{n=-\infty}^{\infty}\delta\left(y\cos\theta - x\sin\theta - \frac{n}{f_v} - \frac{1}{2f_v}\right)\right]$$
(17)

There are two parameters for each latent image object in this type of watermark layer: one is the modulation frequency and the other is the modulation orientation. The parameters for the latent image $g_u$ are $f_u$ and $\vec{u}$. While the parameters for the latent image $g_v$ are $f_v$ and $\vec{v}$. Only a decoder with the corresponding frequency can make a particular latent image visible when it's rotated to the corresponding direction. So the keys to the secrets in this type of watermark layer are the modulation frequency and the modulation orientation.

Multiple Layers Structure

Figure 4:
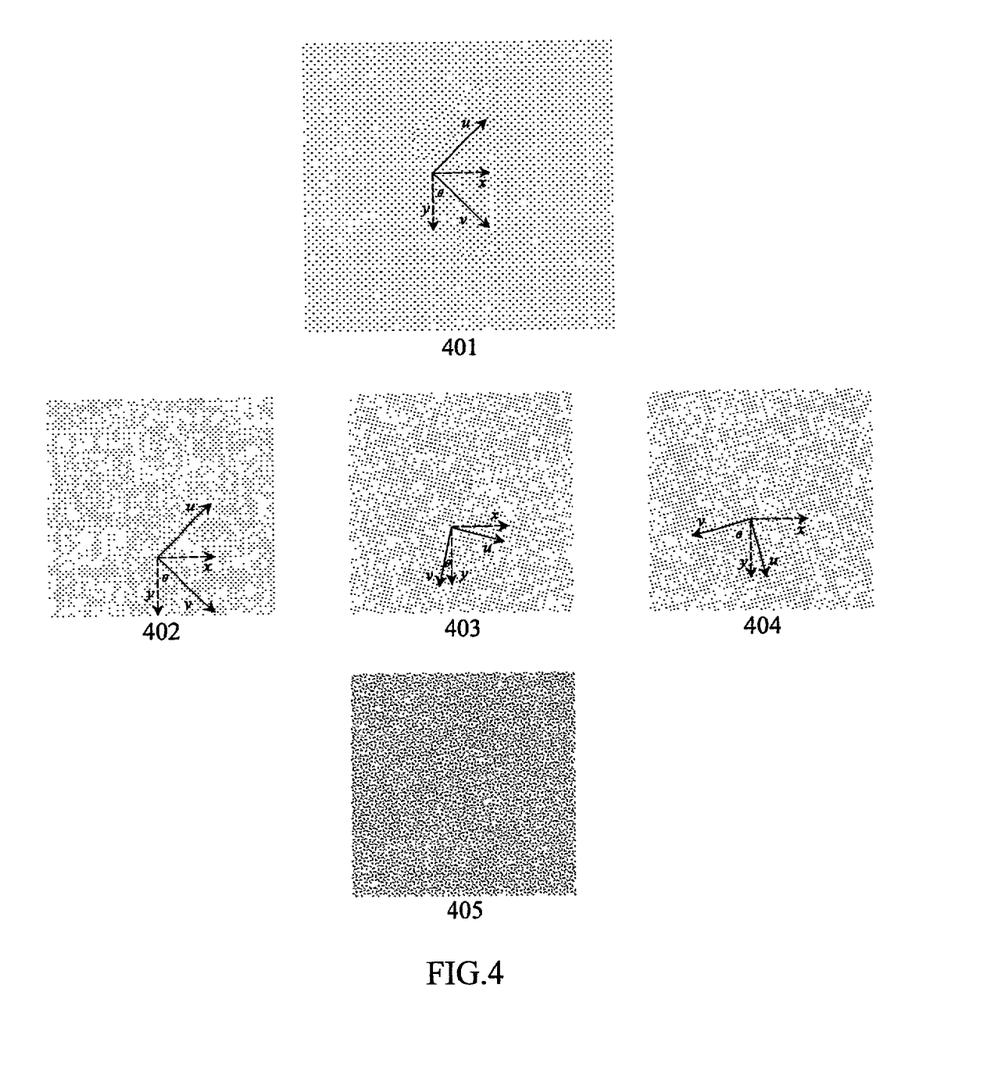
FIG. 4 shows the structure of the optical watermark.

Reference is now made to FIG. 4 where FIG. 401 shows the coordinates of one watermark layer, with reference to a x-y co-ordinate. FIG. 402, 403 and 404 are three watermark layers, and FIG. 405 is their superposition result.

The optical watermark is the superposition of several watermark layers. Such superposition can be represented as $$W = \prod_{n=1}^{N} L_n(f_{u,n}, f_{v,n}, \theta_n, g_{u,n}, g_{v,n})$$
(18)

According to the above analysis, there would be some low frequency components in this superposition of multiple repetitive structures. Such low frequency components could probably bring unwanted visual effects, or even reveal the latent images without decoders. This problem can be avoided if the following requirements can be met for any two layers, $L_i$ and $L_j$, in the optical watermark:

1. If $f_{u,i}=f_{u,j}$ or $f_{v,i}=f_{v,j}$, the orientation difference $\Delta\theta_{ij}$ should be large enough, for example $\Delta\theta_{ij} \geq 60°$, or in some cases $\Delta\theta_{ij} \geq 45°$.

2. If $f_{u,i}=f_{v,j}$, $\Delta\theta_{ij}$ should be less than 60°, for example $\Delta\theta_{ij} \leq 60°$ (where $\Delta\theta_{ij}=\arccos(|\cos(\theta_i-\theta_j)|)$, and $0° \leq \Delta\theta_{ij} \leq 90°$)

The above two requirements mean that no component will have a frequency much lower than the frequency of any carrier dot arrays in the superposition. FIG. 4(05) shows an sample of the optical watermark, which is the superposition of FIG. 4(02), FIG. 4(03) and FIG. 4(04).

When the decoder, which is represented with the fuction $d(x,y)$, are superposed onto the optical watermark, the result of the decoding can be respresented as $$D = d(x, y) \cdot W = d(x, y) \cdot \prod_{n=1}^{N} L_n(f_{u,n}, f_{v,n}, \theta_n, g_{u,n}, g_{v,n})$$
(19)

$$d(x, y) = 1 - \sum_{n=-\infty}^{\infty}\delta\left(x\cos\theta_d + y\sin\theta_d - \frac{n}{f_d}\right)$$
(20)

From the analysis in Appendix A, the following results can be obtained:

1. When $f_d$ equals $f_{u,i}$ and $|\theta_d-\theta_i|$ is very small, the latent image $g_{u,i}(x,y)$ will be visible in the superposition.

2. When $f_d$ equals $f_{v,i}$ and $|\theta_d-\theta_i|$ is almost 90°, the latent image $g_{v,i}(x,y)$ will be visible in the superposition.

The frequency and the orientation of the decoder are the keys to decode the latent image objects. Only when the frequency of the decoder matches the modulation frequency and orientation of a particular latent image object, will the latent image object appear in the superposition.

Hence, in the mutilple-layer stucture, all latent image objects can be decoded seperately from the watermark layers. Every watermark layer carries its own latent image objects, and from the knowledge of one particular watermark layer it is very difficult, and almost impossible, to derive the latent images or the parameters of the other watermark layers.

The other advantage of this multiple-layer structure is that all the watermark layers protect each other. Without knowing the details (parameters and latent image objects) of all the watermark layers, it's very difficult, and almost impossible, to change the information in one of the watermark layers. If one of the watermark layers is changed, all other watermark layers will also be affected by this change. Therefore, this change, even it may be authorized by one party, will invalidate the authenticity of the document, in a scenario of a multiple party application, where each party is holding a "key" to a latent image object.

Coordinate mapping to generate complex watermark layer

In a basic watermark layer, the key space to the hidden information is the frequency of the decoder, which is relatively small. Generally, basic 2-D dot arrays can be generalized to any 2-D pattern, by coordinate mapping and superposition.

In the case of coordinate mapping, linear or non-linear coordinate mapping functions are applied to the basic watermark layer. These mapping functions can be represented as $$x=m_x(u,v)$$ (21)

$$y=m_y(u,v)$$ (22)

Functions $m_x(u,v)$ and $m_y(u,v)$ map the coordinate space from (u,v) to (x,y). In (u,v) coordinate space, the modulation and demodulation of the watermark layer are the same as the basic watermark layer. But the demodulation with a decoder is done in the (x,y) coordinate space. Hence, the decoder in the (x,y) coordinate space should be mapped from the corresponding decoder in the (u, v) coordinate space. So in coordinate mapping the watermark layer, the parameters of a latent image object are the modulation frequency of the latent image object in the (u,v) coordinate space, the modulation orientation of the latent image object in the (u,v) coordinate space, and the mapping functions $m_x(u,v)$ and $m_y(u,v)$.

For example, the sine function as the mapping function. The mapping of coordinate system can be represented as:

$$x = \sin\frac{2\pi}{T}v + u \tag{23}$$

$$y = v \tag{24}$$

While the dot array in the (u,v) coordinate space is represented as:

$$f(u, v) = 1 - \sum_{n=-\infty}^{\infty} \delta\left(u - \frac{n}{f_u}\right) \sum_{n=-\infty}^{\infty} \delta\left(v - \frac{n}{f_v}\right) \tag{25}$$

With coordinate mapping, the corresponding fuction in the (x,y) coordinate space can be derived as:

$$f'(x, y) = 1 - \sum_{n=-\infty}^{\infty} \delta\left(x - \sin\frac{2\pi}{T}y - \frac{n}{f_u}\right) \sum_{n=-\infty}^{\infty} \delta\left(y - \frac{n}{f_v}\right) \tag{126}$$

In order to demodulate the latent image object embedded in the watermark layer with coordinate system mapping, the original decoder should also be mapped from the (u,v) coordinate system to the (x,y) coordinate system:

$$d(u, v) = 1 - \sum_{n=-\infty}^{\infty} \delta\left(u - \frac{n}{f_u}\right) \tag{27}$$

$$d'(x, y) = 1 - \sum_{n=-\infty}^{\infty} \delta\left(x - \sin\frac{2\pi}{T}y - \frac{n}{f_u}\right) \tag{28}$$

For the latent image in the mapped watermark layer f'(x,y), the corresponding decoder is d'(x,y) in eq. (28) but not $d_0(x,y)$ in eq. (27). As can be seen from equation (28), that the key space is expanded by two factors: one is the sine function, and the other is the period of the sine function.

Random pattern watermark Layer

To refer to FIG. 5, FIG. 501, 502 and 503 are simple watermark layers with/without phase modulation. It is relatively simple to derive parameters from them. FIG. 504,505 and 506 are watermark layers with random dot patterns. It is very complex, and virtually impossible, to recover latent image object information without decoders.

Figure 5:
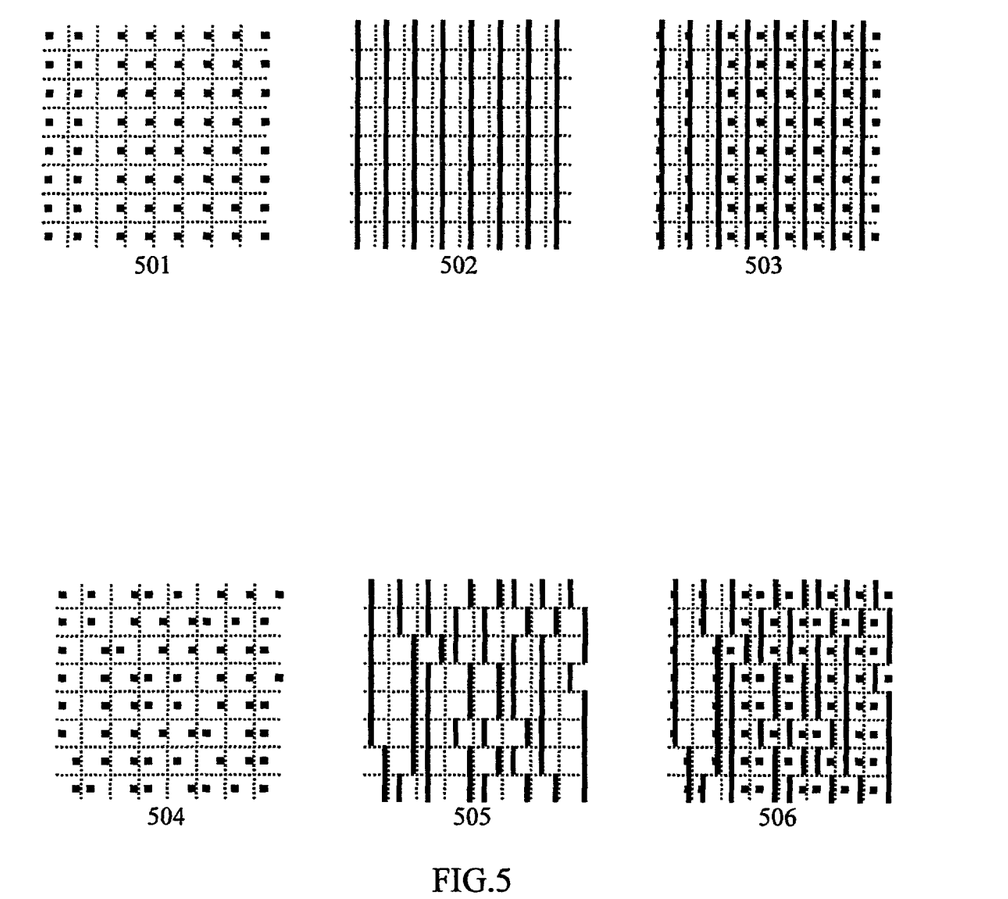
FIG. 5 shows a watermark with a random dot pattern.

The key space of the decoder used to view the embedded latent image object is an indication of the security a watermark method or apparatus may have. The key space is very small for the prior art patents listed earlier. It is possible to find the key space with careful analysis or brute force attack from an expert in the area. As a few examples, FIG. 501, 502 and 503 show regular patterns with andwithout phase modulation. From the view point of cryptography, the problem of these watermark layers is that the space of the keys is too small. It is obvious that one can easily derive the key parametter by observing the watermark.

By linear and non-linear mapping of the basic watermark layer, the key space can be expanded by two factors. To further expand the key space to increase the security of the hidden information, the watermark layer can be further generalised as a random pattern in a 2-D space.

According to information theory, the amount of information of the latent image object can reach its maximum when it is randomly distributed. In a random pattern watermark layer, the randomly distributed information is divided into two parts: the watermark layer is generated based on one part, while the decoder is generated based on the other part. Hence, both of the watermark layer and the decoder hold the information about the latent image object. The latent image is recoverable only when both the watermark layer and the decoder are presented.

Two functions $g_w(x,y)$ and $g_d(x,y)$ can be generated based on the latent image object g(x,y) and a random function r(x,y), which will return either 0 or 1 at random. The function $g_w(x,y)$ is then encoded into the girds of the watermark layer with phase modulation, while the function $g_d(X, y)$ is also encoded into the line gratings of the decoder with phase modulation. Note that the value of $g_w(x,y)$, $g_d(x, y)$ and g(x, y) can only be either 1 or 0.

$$g_w(x,y) = g(x,y)r(x,y) + [1-g(x,y)][1-r(x,y)] \tag{29}$$

$$g_d(x,y) = r(x,y) \tag{30}$$

No information about the latent image object can be found from investigating the function either $g_d(x,y)$ or $g_w(x,y)$. There is a relationship between the function $g_d(x,y)$ and $g_w(x,y)$. If the value of g(x,y) is 1, the function $g_d(x,y)$ equals to $g_w(x,y)$. While if the value of g(x,y) is 0, the function $g_w(x,y)$ equals to $1-g_d(x,y)$.

The watermark layer can be represented as:

$$w(x, y) = \tag{31}$$

$$g_w(x, y)\left[1 - \sum_{n=-\infty}^{\infty} \delta(x - nT_x) \sum_{n=-\infty}^{\infty} \delta(y - nT_y)\right] + [1 - g_w(x, y)]$$

$$\left[1 - \sum_{n=-\infty}^{\infty} \delta\left(x - nT_x - \frac{1}{2}T_x\right) \sum_{n=-\infty}^{\infty} \delta(y - nT_y)\right]$$

And the decoder as:

$$d(x, y) = g_d(x, y) \tag{32}$$

$$\left\{1 - \sum_{n=-\infty}^{\infty} \delta(x - nT_x) \sum_{n=-\infty}^{\infty} [u(y - nT_y) - u(y - nT_y - T_y)]\right\} + [1 -$$

$$g_d(x, y)]\left\{1 - \sum_{n=-\infty}^{\infty} \delta\left(x - nT_x - \frac{1}{2}T_x\right)\right.$$

$$\left.\sum_{n=-\infty}^{\infty} [u(y - nT_y) - u(y - nT_y - T_y)]\right\}$$

From above equations, it can be seen that when the value of g(x,y) is 0, there is a relatve phase difference between the watermark layer and the decoder, and that when the value of g(x,y) is 1, there is no relatve phase difference between the watermark layer and the decoder. This implies that the latent image will appear because of the demodulation of the relative phase difference when the watermark layer and decoder are correctly overlapped.

FIGS. 504, 505 and 506 are examples of the random pattern watermark layers corresponding to FIG. 501, FIG. 502 and FIG. 503.

Since the amount of information in a random pattern watermark layer is 2 to the power of the dimension of the latent image object, the security level will be very high. Since both the watermark layer and the decoder carry part of the latent image object, from either the watermark layer or the decoder alone it is virtually impossible to derive the other. On other hand, a random pattern watermark layer needs accurate alignment to reveal the latent image object.

Counterfeit-proof Layer

The dot pattern of a watermark layer can be the result of a set of operations on one, or a set of basic, and other types of dot patterns. Here, the counterfeit-proof layer is an example. The counterfeit-proof layer is a special watermark layer where a photocopier is the decoder to the latent image object. The dot pattern in the counterfeit-proof watermark layer is based on the superposition of the basic dot arrays. The latent image object in this layer, which can be some cancelation words such as "COPY", can be represented as a function $g_c(x,y)$. The value of this function can only be 0 or 1. Then this layer can be represented as a function $w_c(x,y)$.

$$w_c(x, y) = [1 - g_c(x, y)]f_a(x, y)f_a(x + \Delta, y + \Delta) + \qquad (33)$$
$$g_c(x, y)f_b(x, y)f_b\left(x + \frac{T_b}{2}, y + \frac{T_b}{2}\right)$$

$$f_a(x, y) = 1 - \sum_{n=-\infty}^{\infty} \delta(x - nT_a) \sum_{n=-\infty}^{\infty} \delta(y - nT_a) \qquad (34)$$

$$f_b(x, y) = 1 - \sum_{n=-\infty}^{\infty} \delta(x - nT_b) \sum_{n=-\infty}^{\infty} \delta(y - nT_b) \qquad (35)$$

The functions $f_a(x,y)$ and $f_b(x,y)$ represent two sets of basic dot arrays. The repetitive period $T_a$ of $f_a(x,y)$ is slightly larger then the period $T_b$ of $f_b(x,y)$. And the $\Delta$ in eq. (33) represents a small displacement.

Figure 6:
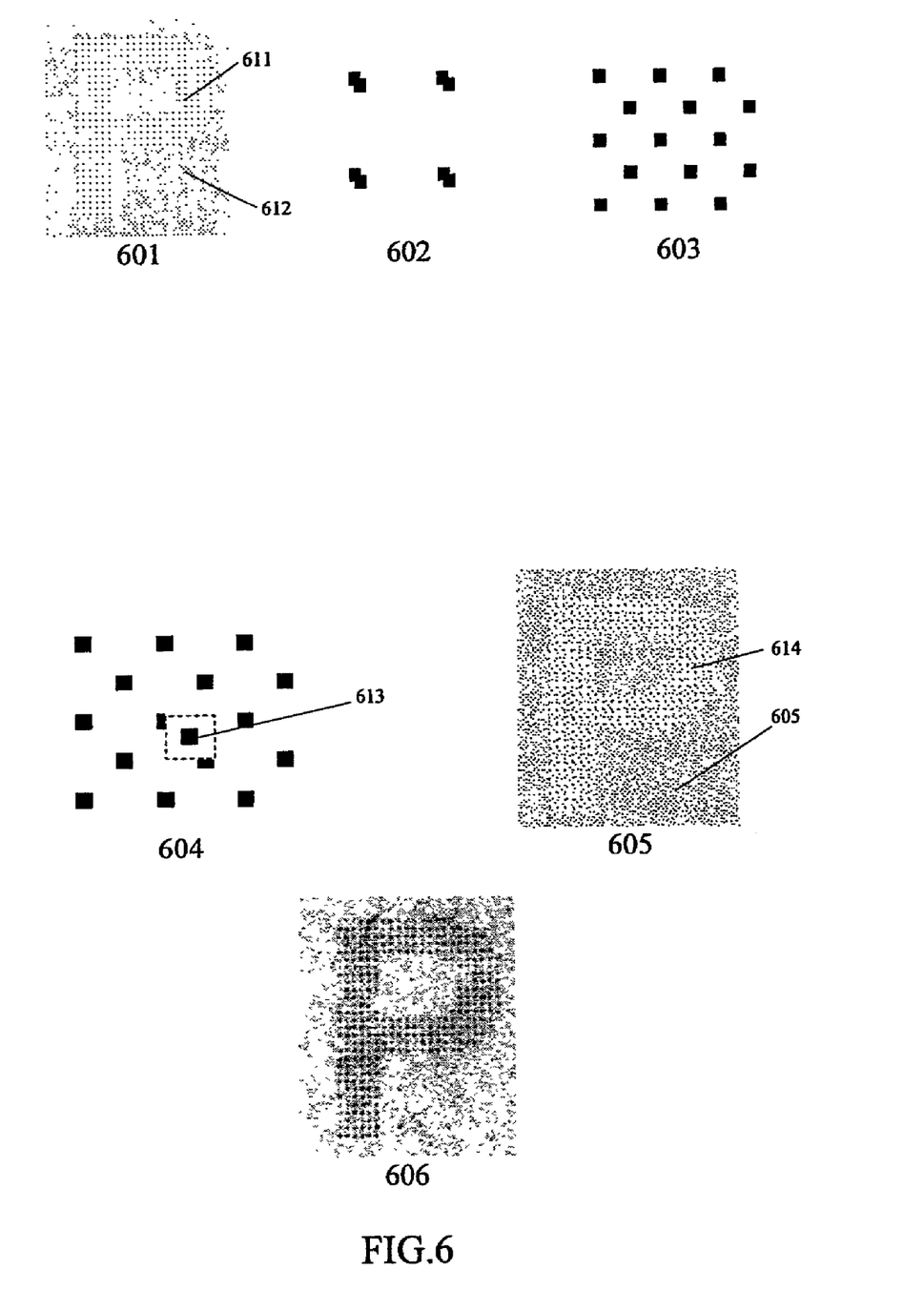
FIG. 6 shows a counterfeit-proof watermark layer with a letter "P" embedded.

FIG. 601 is a sample of such a counterfeit-proof layer. FIG. 602 is a enlarged view of the overlapped dot arrays which are represented by $f_a(x,y)f_a(x+\Delta,y+\Delta)$. Each dot in the dot array $f_a(x,y)$ will adjoin to a dot in the other dot array $f_a(x+\Delta,y+\Delta)$ because $\Delta$ is a small enough displacement. While FIG. 603 is an enlarged view of the overlapped dot arrays which are represented with $$f_b(x, y)f_b\left(x + \frac{T_b}{2}, y + \frac{T_b}{2}\right).$$

Because of the displacement $$\frac{T_b}{2},$$

no dot in the dot array $f_b(x,y)$ will adjoin to a dot in the other dot array $$f_b\left(x + \frac{T_b}{2}, y + \frac{T_b}{2}\right).$$

In order to let the latent image object appear after photocopying, the dot size in this counterfeit-proof layer should be carefully chosen. It should be smaller than the size of the dot that a photocopier can sample.

A preferred dot size is $$\frac{1}{600}$$

inches, because the optical resolution of most photocopiers is less than 600 lpi. Such dots will disappear after photocopying because they are too small to be recognized by the photocopier. As such, the regions where the value of $g_c(x,y)$ is 1, will fade after photocopying because all dots in these regions are isolated and cannot be sampled by the photocopier. On other hand, the regions where the value of $g_c(x,y)$ is 0, will still remain because adjacent dot pairs are viewed as having a relatively large size, and can be sampled by the photocopier. Hence the latent image object will be able to appear after photocopying.

Note both frequencies, $$\frac{1}{T_a}$$

and $$\frac{1}{T_b},$$

in eq. (33) should be high enough to exceed the resolution limit of the human visual system. According to the characteristics of the human visual system, the detailed structure of the counterfeit-proof layer will not be observable by unaided eyes. The regions where the value of $g_c(x,y)$ is 0 will look lighter in the grey scale than the regions where the value of $g_c(x,y)$ is 1.

Superposition of the counterfeit-proof layer with other watermark layers protects the counterfeit-proof layer. Because of the simple structure of the counterfeit-proof layer, it is relatively easy to analyse the layer and reproduce it.

Superposition of counterfeit-proof layer with other watermark layers is also operated according to eq. (18). The only necessary post-processing is for the region outside the latent image object. FIG. 6 of relevance here with FIGS. 602 and 603 representing typical dot patterns in object regions and non-object regions. FIG. 604 illustrates the post-processing for superposition of a counterfeit-proof layer with other watermark layers. FIG. 605 is the superposition result and FIG. 606 is the photocopying result of FIG. 605. As shown in FIG. 604, when a dot 613 of the watermark layer is superposed onto the counterfeit-proof layer, all other dots with a area indicated by the dash line box should be removed. The principle is that the superposition should not change the grey level of the regions where the value of $g_c(x,y)$ is 1. As the result of superposition, both the inside and the outside of the latent image object have the same grey level. Because the structure in the counterfeit-proof layer has a frequency exceeding the resolution of the human visual system, it looks like a patch of countious grey tone to unaided eyes. FIG. 605 is a enlarged view of the superposition, FIG. 606 shows the result after photocopying. The latent image object "P" appears clearly.

Optical watermark in document delivery, archival and authentication. The optical watermark can be applied to an electronic document. The optical watermark added to the document can be viewed as a seal to provide authenticity to the document. The visual appearance of the optical watermark can be designed as a logo or seal of the authority to provide immediate trust. The embedded information can be the name, signature and logo of the authority, or some number or words related to the document content.

Figure 7:
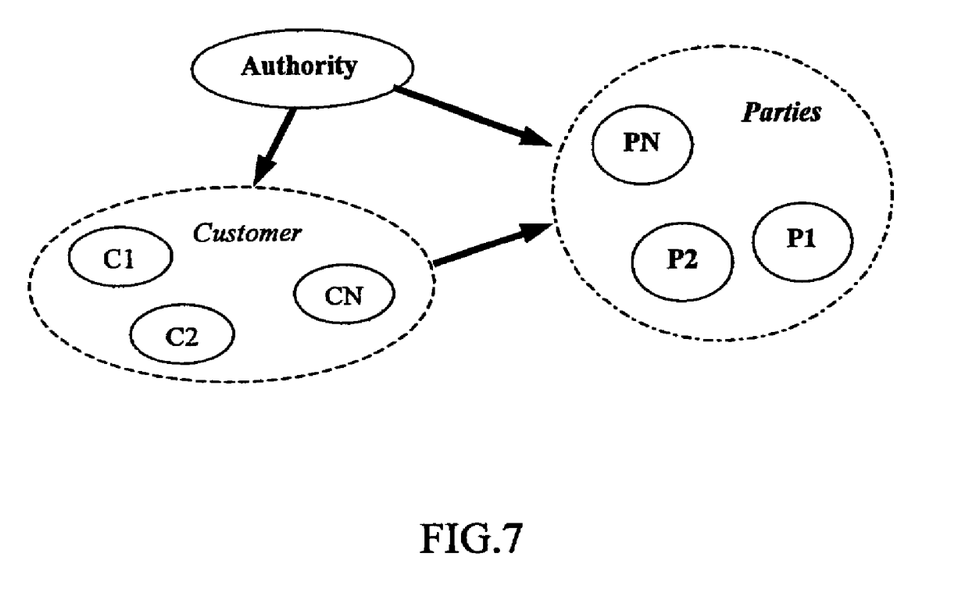
FIG. 7 is an electronic application.

As show in the FIG. 7, application scenario 1 is an authority such as, for example, an immigration department of a government, which issues passports to citizens. Here, the optical watermark is attached to a page of the passport, either as the background or as a seal of the immigration department. A photograph of the passport holder is embedded into one layer, and the name and birth date is on the other layers. Finally, a special symbol is embedded into a random pattern watermark layer. Key lenses are distributed to various parties who need to verify the validity of the passport. The random key can be retained by the immigration department for final verification. Here, the passport is issued by the immigration department, and the holder may need to be checked by other parties such as passport controller of other countries.

Figure 8:
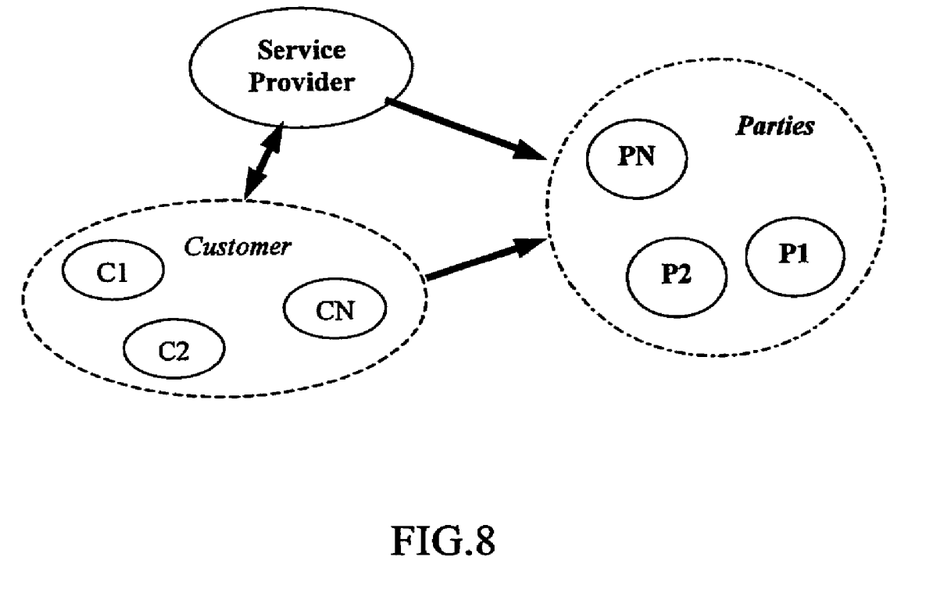
FIG. 8 is an electronic service model.

Another type of application is illustrated in FIG. 8, which is a service model. A service provider provides delivery and authentication services to customers. A customer, for example, a shipping company, issues a bill of lading through the service provider to a shipper or consignee. An optical watermark, having a shape of the carrier's logo, is placed on all non-negotiable bills of lading as background. Verification keys are distributed to banks and carrier agents for authentication purposes when the shipper and consignee use the bill of lading to claim the money and cargo. The key lenses can be replaced periodically, for example, every 6 months, by the service provider for security reasons.

The optical watermark described above can be readily applied to a document using more than one colour such as, for example, but not limited to, having different watermark layers into different colour channels in various colour spaces. Examples are CMYK and RGB.

Whilst there has been described in the foregoing description a preferred embodiment of the present invention, it will be understood by those skilled in the technology that may variations or modifications may be made without departing from the present invention.

The invention claimed is:

1. A method for producing an optical watermark on a document, the method including:
    a) determining a required plural number of watermark layers and a dot pattern for each watermark layer, the dot pattern having a fixed frequency for each direction in the dot pattern;
    b) selecting at least one latent image object for each watermark layer
    c) modulating a phase of the dot pattern to embed each latent image object into its respective watermark layer;
    d) superposing the watermark layers to form the watermark;
    e) defining and generating a decoder for each watermark layer, the decoder matching a phase unmodulated dot pattern of each corresponding watermark layer; and
    f) applying the optical watermark to the document;
    wherein the decoder is used to decode the at least one latent image object for each watermark layer.

2. The method of claim 1, wherein the dot pattern for each watermark layer is a pattern defined on a two dimensional digital image plane.

3. The method of claim 2, wherein the dot pattern is a basic two-dimensional dot array.

4. The method of claim 2, wherein the dot pattern is a linear coordinate mapping of a basic two-dimensional dot array.

5. The method of claim 2, wherein the dot pattern also includes a non-linear coordinate mapping of a basic two-dimensional dot array.

6. The method of claim 2, wherein the dot pattern is a result of a set of operations on a set of basic and other types of two-dimensional dot arrays.

7. The method of claim 1, wherein the latent image objects contain information which is critical to an application.

8. The method of claim 7, wherein the information is from the group consisting of: copy, void, a critical name, and a number from the document.

9. The method of claim 1, wherein the phase modulation includes a post-processing to smooth any abrupt phase changes along the edges of the latent image object.

10. The method of claim 1, wherein the decoder has a decoder structure related to a dot pattern structure of a carrier dot pattern of the watermark layer and in the direction where the latent image object is embedded.

11. The method of claim 10, wherein the relationship is selected from the group consisting of: the same, and conjunct.

12. The method of claim 10, wherein one of the watermark layers is a counterfeit-proof layer, the decoder for which is a photocopier.

13. The method of claim 12, wherein after the superposition of the watermark layers with the counterfeit-proof layer there is included a post-processing step to remove dots which are too close to adjacent dots in a non-object area.

14. The method of claim 1, wherein after modulation the watermark layer and its decoder each carries part of the information of the latent image object which is generated based on the latent image object and a random function.

15. The method of claim 1, wherein the watermark layers are different from each other and are of sufficient difference to avoid interference between them as a result of them being superimposed.

16. The method of claim 1, wherein the method is included in a method for printing a document for protection and authentication, the method further including:
    a) verifying the authenticity and copyright of the document before printing;
    b) generating the watermark according to the method of claim 1;
    c) controlling the printing process to protect the document and the watermark from attack; and
    d) generating the decoder device and distributing the decoder device to enable verification of the authenticity of the document.

17. The method of claim 1, wherein the watermark is extended to colour documents.

18. The method of claim 17, wherein the watermark layers are in different colour channels in various colour spaces.

19. The method of claim 18, wherein colour spaces CMY/CMYK, HIS, XYA, YUV and RGB are used.

* * * * *